United States Patent
Kobayashi et al.

(10) Patent No.: US 10,583,866 B2
(45) Date of Patent: Mar. 10, 2020

(54) WORK VEHICLE

(71) Applicant: Komatsu Ltd., Tokyo (JP)

(72) Inventors: Takaya Kobayashi, Tokyo (JP); Hirofumi Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 109 days.

(21) Appl. No.: 15/747,233

(22) PCT Filed: Jul. 20, 2017

(86) PCT No.: PCT/JP2017/026266
§ 371 (c)(1),
(2) Date: Jan. 24, 2018

(87) PCT Pub. No.: WO2017/195907
PCT Pub. Date: Nov. 16, 2017

(65) Prior Publication Data
US 2019/0023326 A1  Jan. 24, 2019

(51) Int. Cl.
*B62D 25/12* (2006.01)
*B62D 33/06* (2006.01)
*E02F 9/16* (2006.01)
*B60R 3/00* (2006.01)
*E02F 9/08* (2006.01)
*B60S 1/34* (2006.01)
*B62D 25/08* (2006.01)

(52) U.S. Cl.
CPC .............. *B62D 25/12* (2013.01); *B60R 3/005* (2013.01); *B62D 33/06* (2013.01); *E02F 9/0833* (2013.01); *E02F 9/0866* (2013.01); *E02F 9/16* (2013.01); *B60S 1/3402* (2013.01); *B62D 25/082* (2013.01)

(58) Field of Classification Search
CPC .................................................. B62D 33/0617
USPC ...... 296/190.08, 102; 280/166, 755; 72/105, 72/84, 94
See application file for complete search history.

(56) References Cited

U.S. PATENT DOCUMENTS 3,866,942 A    2/1975  Dobeus et al.
5,042,612 A *  8/1991  Bennett .................. B65G 69/22
                                                182/1
(Continued)

FOREIGN PATENT DOCUMENTS

JP    08-246718 A    9/1996
JP    2000-291068 A   10/2000
(Continued)

*Primary Examiner* — D Glenn Dayoan
*Assistant Examiner* — Sunsurraye Westbrook
(74) *Attorney, Agent, or Firm* — Locke Lord LLP

(57) ABSTRACT

A work vehicle comprising: a cab, an inside of which is a cockpit, having a window portion; a vehicle body having a passage on a periphery of the cab; a front lateral wiper provided so as to be rotatable around a first axis and along the window portion, and rotating around a second axis that extends in a different direction with the first axis in a movement range between a normal position that is in contact with the window portion and a rising position separated from the window portion; and a passage fence extending along an outer edge of the passage. The passage fence is configured to open upward with penetrating the passage fence inwardly and outwardly, and a part of the passage fence has an opening that includes the movement range of the front lateral wiper.

6 Claims, 6 Drawing Sheets

(56) References Cited

U.S. PATENT DOCUMENTS

| | | | | |
|---|---|---|---|---|
| 5,722,108 | A * | 3/1998 | Sakyo | B60S 1/04 |
| | | | | 15/250.19 |
| 8,938,846 | B2 * | 1/2015 | Bichler | B60S 1/026 |
| | | | | 15/250.001 |
| 2005/0242611 | A1 * | 11/2005 | Weind | B60J 1/002 |
| | | | | 296/96.15 |
| 2014/0110972 | A1 * | 4/2014 | Ohnishi | B60S 1/06 |
| | | | | 296/190.08 |
| 2015/0102626 | A1 * | 4/2015 | Jozwiak | B60S 1/0488 |
| | | | | 296/96.15 |
| 2015/0246642 | A1 | 9/2015 | Vernickel et al. | |
| 2015/0275479 | A1 | 10/2015 | Kitashou et al. | |

FOREIGN PATENT DOCUMENTS

| | | |
|---|---|---|
| JP | 2012-162932 A | 8/2012 |
| JP | 2015-159771 A | 9/2015 |
| JP | 2017-088034 A | 5/2017 |

\* cited by examiner

WORK VEHICLE

CROSS REFERENCE TO RELATED APPLICATIONS

This application is related to co-pending application: "CAB OF WORK VEHICLE AND WORK VEHICLE" filed even date herewith in the name of Takaya KOBAYASHI as a national phase entry of PCT/JP2017/026260, which application is assigned to the assignee of the present application and is incorporated by reference herein.

TECHNICAL FIELD OF THE INVENTION

The present invention relates to a work vehicle.

DESCRIPTION OF THE RELATED ART

Patent Document 1 discloses a work vehicle provided with a passage which is disposed around a cab, an inside of which is a cockpit, and which is for use in maintenance work or the like. In a window portion of the cab, a wiper is provided. In an outer edge of the passage of the work vehicle of the cab, a passage fence which is integrally fixed to the passage is provided.

PRIOR ART DOCUMENT

Patent Document

Patent Document 1: Japanese Unexamined Patent Application, First Publication No. 2000-291068.

BRIEF SUMMARY OF THE INVENTION

Problems to be Solved by the Invention

Incidentally, when a worker performs maintenance work on the window portion or the wiper of the cab, the wiper is rotated to a rising position that is separated from the window portion from the normal position that is in contact with the window portion. At this time, if the wiper interferes with the passage fence, the wiper cannot be separated from the window portion to a location beyond the passage fence, and thus workability in the passage is impaired.

The present invention is provided in view of such problems, and an object thereof is to provide a work vehicle which is capable of improving maintainability.

Means for Solving the Problem

The work vehicle according to one aspect of the present invention includes, a cab, an inside of which is a cockpit, having a window portion; a vehicle body having a passage on a periphery of the cab; a wiper provided so as to be rotatable around a first axis and along the window portion, and rotating around a second axis that extends in a different direction with the first axis in a movement range between a normal position that is in contact with the window portion and a rising position separated from the window portion; and a passage fence extending along an outer edge of the passage. The passage fence has an opening in part thereof, and the opening is opened upward, passes through from an inside to an outside of the passage fence, and includes the movement range of the wiper.

Effects of the Invention

According to the work vehicle of the above aspects, it is possible to improve maintainability.

DETAILED DESCRIPTION OF THE INVENTION

Hereinafter, embodiments of a wheel loader which is an example of a work vehicle according to the present invention will be described in detail with reference to the drawings.

<Work Vehicle>

Figure 1:
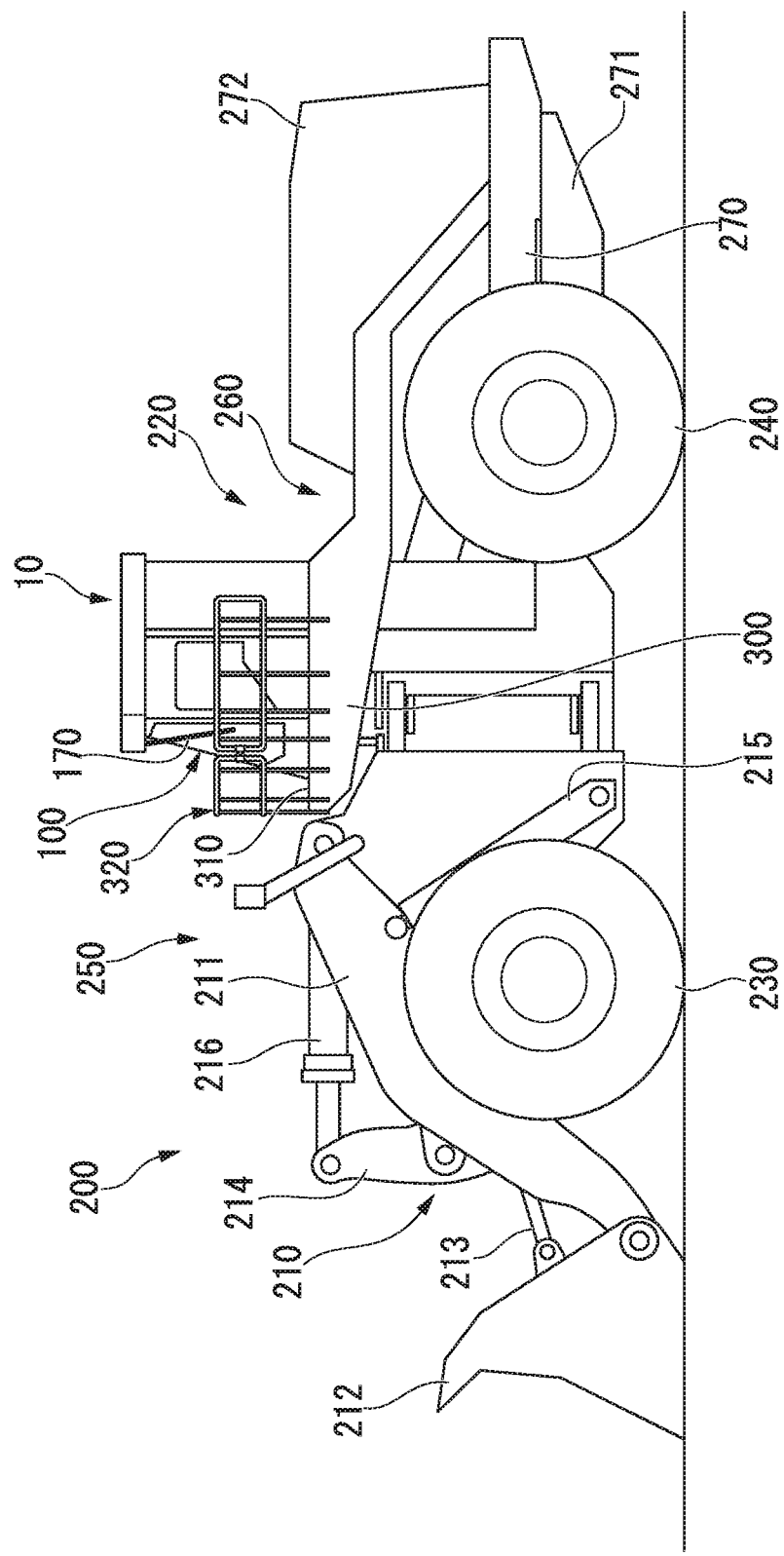
FIG. 1 is a side view of a wheel loader as a work vehicle according to an embodiment of the present invention.

As shown in FIG. 1, a wheel loader 200 as the work vehicle has a work equipment 210 and a vehicle body 220. In the following, front-rear directions of the vehicle body 220, a forward direction of the vehicle body 220, a rearward direction of the vehicle body 220, and a width direction of the vehicle body 220 may be simply referred to as "front-rear directions", "forward", "rearward", and "vehicle width direction", respectively, in some cases. The vehicle width directions may be referred to as a "right side" or "left side" in some cases. A direction toward a center of the vehicle body 220 in the vehicle width direction may be referred to as "inward in a vehicle-width direction", and directions toward a right side or left side from the center of the vehicle body 220 in the vehicle width direction may be referred to as "outward in a vehicle-width direction" in some cases. A vertical direction, an upward direction, and a downward direction of the vehicle body 220 in a state where the vehicle body 220 is arranged on a horizontal plane may be simply referred to as "vertical direction", "upward", and "downward" in some cases.

<Work Equipment>

The work machine 210 is provided in a front part of the vehicle body 220. The work machine 210 has a boom 211 and a bucket 212. The boom 211 is rotatably connected to the vehicle body 220. The bucket 212 is connected to one end of a bell crank 214 via a link 213. A bucket drive cylinder 216 is connected to the other end of the bell crank 214. The bucket 212 is rotatably connected to the tip of the boom 211. The boom 211 is driven by a boom driving cylinder 215, and the bucket 212 is driven by the bucket drive cylinder 216. The boom driving cylinder 215 and the bucket drive cylinder 216 are driven by hydraulic pressure supplied via the hydraulic circuit.

<Vehicle Body>

Figure 2:
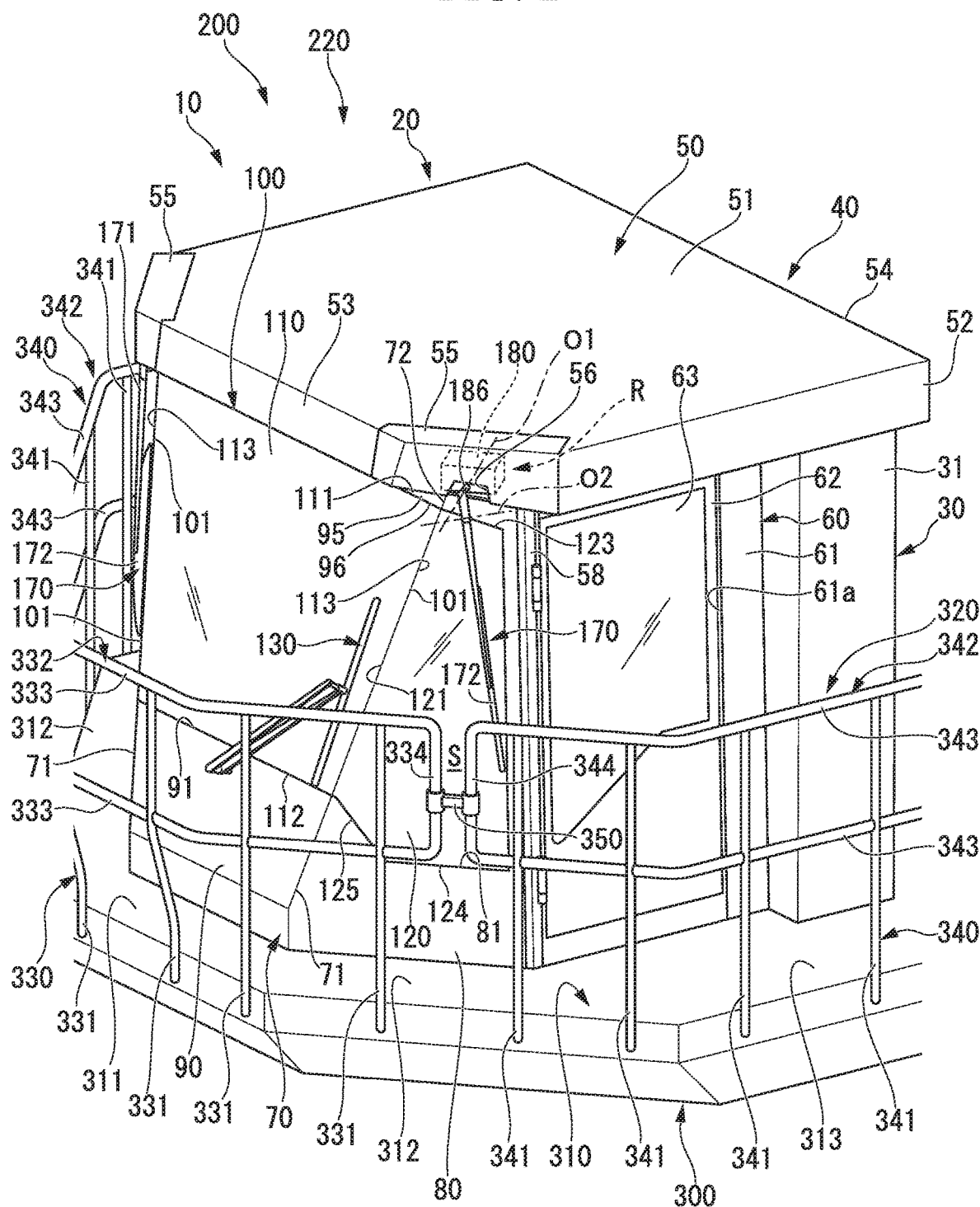
FIG. 2 is a perspective view of the work vehicle in the vicinity of a cab of the work vehicle according to the embodiment of the present invention.

The vehicle body 220, as shown in FIGS. 1 and 2, includes a vehicle front portion 250, a vehicle rear portion 260, front wheels 230, rear wheels 240, a cab 10, a front wiper 130, a front lateral wiper 170, a wiper drive device 180, a passage forming portion 300, and a passage fence 320.

The vehicle front portion 250 constitutes a front part of the vehicle body 220. The working equipment 210 is provided in the vehicle front portion 250 of the vehicle body 220. The vehicle rear portion 260 constitutes a rear part of the vehicle body 220. Since the vehicle front portion 250 and the vehicle rear portion 260 are connected around an axis extending in the vertical direction, the vehicle front portion 250 and the vehicle rear portion 260 are mutually rotatable in the horizontal direction. A pair of front wheels 230 is provided on the vehicle front portion 250 so as to be separated from each other in the vehicle width direction. A pair of rear wheels 240 is provided on the vehicle rear portion 260 so as to be separated from each other in the vehicle width direction. By driving the front wheels 230 and the rear wheels 240, the vehicle body 220 moves forward and rearward.

The vehicle rear portion 260 has a rear frame 270, a fuel tank 271, and an engine room 272.

The rear frame 270 is a member extending in the front-rear directions, and a pair of rear frames is provided in parallel with a distance in the width direction.

The fuel tank 271 is provided below a rear part of the vehicle rear portion 260, and fuel is reserved.

The engine room 272 is provided above a rear part of the rear frame 270. Inside the engine room 272, an engine driven by supplying the fuel, a cooling unit for cooling the engine, and the like are provided. The output of the engine is transmitted to hydraulic equipment such as a hydraulic pump and a torque converter (not shown) to operate the work equipment 210 and the axle device.

<Cab>

Hereinafter, the cab 10 will be described in detail with reference to FIGS. 2 and 3. The cab 10 includes a cab body 20 and a window portion 100.

<Cab Body>

The inside of the cab body 20 is a cockpit for the operator. The cab body 20 has a box shape in which a forward part is opened. The cab body 20 includes a support structure 30, a ceiling 40, a detachable cover 55, a front support post 58, a lateral panel 60 and a front cover 70.

The support structure 30 constitutes a rear part of the cab 10 and has the role of fixing and supporting the cab 10 to the rear frame 270 and a role of protecting the operator by securing an internal space of the cockpit even if the cab 10 receives an impact from an outside. The support structure 30, as shown in FIG. 3, has a rear support post 31 and a rear cross beam 32.

The rear support post 31 is a pillar-shaped member extending upward and a left-right pair of rear support posts 31 is provided with a distance in the vehicle width direction. A lower part of the rear support post 31 is fixed to the rear frame 270. The pair of rear support posts 31 extends in parallel with each other and each rear support post 31 extends upward from a portion fixed to the rear frame 270.

The rear cross beam 32 is a member extending in the vehicle width direction and a pair of rear cross beams 32 is provided so as to connect the upper ends of the pair of rear support posts 31 in the vehicle width direction.

In addition, a rear panel (not shown) extending in the vehicle width direction and the vertical direction is provided at rear portions of the pair of rear support posts 31 and the rear cross beam 32. The rear panel partitions the cockpit from a rear of the cockpit.

<Ceiling>

The ceiling 40 partitions the cockpit from above. As shown in FIG. 3, the ceiling 40 includes a ceiling structure 41, a ceiling board 45, and a ceiling cover 50.

<Ceiling Structure>

The ceiling structure 41 is a framework of the ceiling 40 and is provided so as to protrude from an upper part of the support structure 30 toward the forward side of the support structure 30. The ceiling structure 41 has the role of protecting the operator in the cockpit from above. The ceiling structure 41 has, for example, a side vertical beam 42, a front cross beam 43, and a front vertical beam 44.

The side vertical beam 42 is a member extending in the front-rear directions, and a pair of side vertical beams 42 is provided with a distance in the vehicle width direction. A rear end of each side vertical beam 42 is integrally fixed to the corresponding upper end of the rear support post 31. The pair of side vertical beams 42 extends in parallel with each other and each side vertical beam 42 extends forward from a portion fixed to the corresponding rear support post 31.

The front cross beam 43 is a member extending in the vehicle width direction and is provided so as to connect the front ends of the pair of side vertical beams 42 in the vehicle width direction. The front cross beam 43 is provided in parallel with the rear cross beam 32 and at the same vertical position as the rear cross beam 32.

The front vertical beam 44 is a member extending in front-rear directions, and a pair of front vertical beams 44 is provided with a distance in the vehicle width direction. A rear end of each front vertical beam 44 is integrally fixed to the front cross beam 43. The front vertical beams 44 extend in parallel with each other and each extend forward from a portion fixed to the front cross beam 43. The portion fixed to the front cross beam 43 in each of the front vertical beams 44 is set at a portion inward in the vehicle-width direction as compared with ends outward in the vehicle-width direction of the front cross beam 43. The pair of front vertical beams 44 is provided inward in the vehicle-width direction as compared with the pair of side vertical beams 42. A distance between the pair of front vertical beams 44 in the vehicle width direction is smaller than a distance between the pair of side vertical beams 42 in the vehicle width direction. The front vertical beams 44 are provided in parallel with the side vertical beam 42 and at the same vertical position as the side vertical beam 42.

The ceiling board 45 has a plate shape extending along the horizontal plane. The ceiling board 45 is provided under the ceiling structure 41. The ceiling board 45 is integrally fixed to the lower surfaces of the side vertical beams 42, the front cross beam 43, and the front vertical beams 44.

A side edge portion 46 which is an end outward in the vehicle-width direction of the ceiling board 45 is formed so as to extend in front-rear directions along an outer edge outward in the vehicle-width direction of the side vertical beam 42. A front edge portion 47 which is an end of the ceiling board 45 at a forward side of the vehicle is formed so as to extend in the vehicle width direction along the front ends of the pair of front vertical beam 44. An end outward in the vehicle-width direction of the front edge portion 47 of the ceiling board 45 and a front end of the side edge portion 46 of the ceiling board 45 are connected by an inclined edge portion 48. The inclined edge portion 48 extends so as to incline outward in the vehicle-width direction while extending rearward side. That is, the ceiling board 45 has a shape in which a corner portion positioned forward of the vehicle and outward in the vehicle-width direction is diagonally cut out. The inclined edge portion 48 is formed outward in the vehicle-width direction of the vertical beam 44 and formed forward side of the side vertical beam 42.

<Ceiling Cover>

The ceiling cover 50 covers upper parts of the ceiling structure 41 and the support structure 30. The ceiling cover 50, as shown in FIGS. 2 and 3, has a cover body 51, a cover side-edge portion 52, a cover front-edge portion 53, and a cover rear-edge portion 54.

The cover body 51 is has a plate shape extending along the horizontal plane. The cover body 51 covers an upper end of the ceiling structure 41 and an upper end of the support structure 30. As similar with the ceiling board 45, the cover body 51 has a shape in which a corner portion positioned forward of the vehicle and outward in the vehicle-width direction is diagonally cut out in a plan view.

The cover side-edge portion 52 is connected to an end outward in the vehicle-width direction of the cover body 51. The cover side-edge portion 52 covers the side vertical beams 42 and the rear support post 31 from their outward in the vehicle-width direction. The cover front-edge portion 53 is connected to an end portion on the forward side of the cover body 51. The cover front-edge portion 53 covers the front end of the front vertical beam 44 from the forward side.

The cover rear-edge portion 54 is connected to an end portion on the rearward side of the cover body 51. The cover rear-edge portion 54 covers the rear support post 31 and the rear cross beam 32 from their rearward side. An end outward in the vehicle-width direction of the cover rear-edge portion 54 is connected to the rear end of the cover side-edge portion 52.

The respective sizes in the vertical direction of the cover side-edge portion 52, the cover front-edge portion 53, and the cover rear-edge portion 54 are substantially equal to a vertical gap between the cover body 51 and the ceiling board 45.

An end outward in the vehicle-width direction of the cover front-edge portion 53 and a front end and the cover side-edge portion 52 are separated from each other. Accordingly, the corner portion positioned at a front part and outward in the vehicle-width direction of the ceiling cover 50 is open to the outside of the ceiling cover 50.

Figure 3:
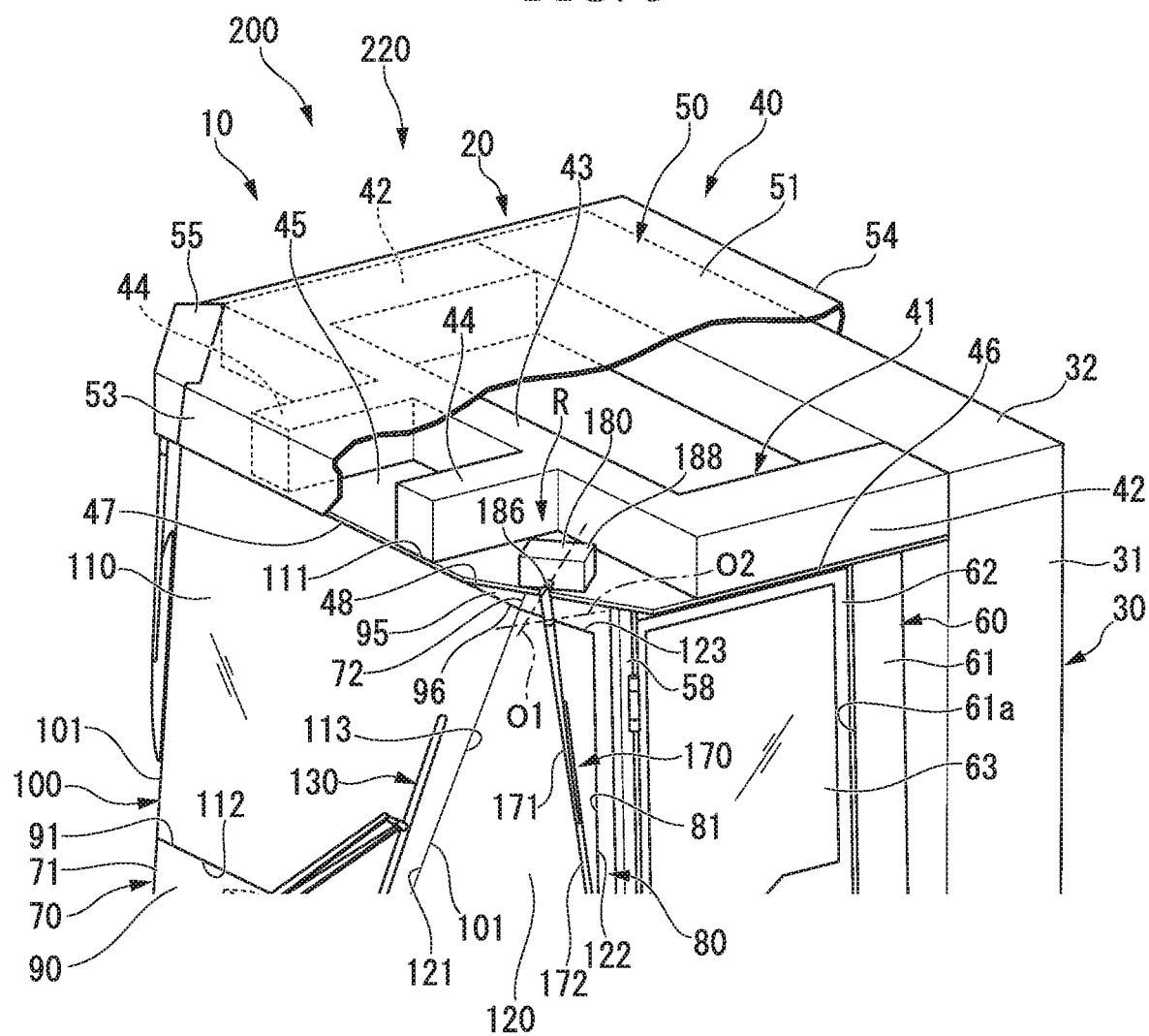
FIG. 3 is a perspective view of the cab of the work vehicle according to the embodiment of the present invention, and is a diagram partially cutaway a ceiling cover.

Here, as shown in FIG. 3, a housing space R is formed in the front portion and outward in the vehicle-width direction of the ceiling 40. The housing space R is formed so as to be partitioned by the front cross beam 43, the front vertical beam 44, the ceiling board 45, and the ceiling cover 50. The housing space R communicates with the outside of the ceiling 40 by the opening of the ceiling cover 50. In other words, the housing space R is open to the outside of the ceiling 40.

<Detachable Cover>

The detachable cover 55, as shown in FIG. 2, is detachably attached to the corner portion positioned at the front part and outward in the vehicle-width direction of the ceiling 40. The detachable cover 55 is fixed to the ceiling cover 50 of the ceiling 40 by fixing members such as bolts, for example. The detachable cover 55 is provided so as to cover the opening of the housing space R of the ceiling 40. In a lower part of the detachable cover 55, a communication hole 56 penetrating the detachable cover 55 is formed. In a state where the detachable cover 55 is attached to the ceiling cover 50, the housing space R of the ceiling 40 communicates with the outside of the ceiling 40 through the communication hole 56.

<Front Support Post>

The front support post 58 is a member having a columnar shape extending in the vertical direction. A pair of front support posts 58 is provided at a front part of the cab body 20 with a distance being provided in the vehicle width direction. The pair of front support posts 58 extends in the vertical direction and in parallel with each other. An upper end of each front support post 58 is fixed to the corner portion positioned at the front part and outward in the vehicle-width direction of the ceiling 40. The pair of front support posts 58 supports a front part of the ceiling 40 at both sides in the vehicle width direction. The pair of front support posts 58 is arranged at the forward side of the corresponding pair of rear support posts 31 with a distance being provided. The distance in the vehicle width direction between the pair of front support posts 58 is the same as the distance in the vehicle width direction between the pair of rear support posts 31.

<Lateral Panel>

The lateral panel 60, as shown in FIG. 2, constitutes parts on both sides in the vehicle width direction of the cab body 20. A pair of the lateral panels 60 is provided so as to partition the cockpit from the both sides in the vehicle width direction. The lateral panel 60 has a plate shape extending in the vertical direction and in the front-rear directions. A front end of the lateral panel 60 is connected to the entire range in the vertical direction of the front support post 58. A rear end of the lateral panel 60 is connected to the entire range in the vertical direction of the rear support post 31. An upper end of the lateral panel 60 is connected to the entire range in the front-rear directions of the ceiling 40.

The lateral panel 60 on the left side of the vehicle width direction is constituted by a door panel 61 and a door 62. The door panel 61 is fixed to the front support post 58, the rear support post 31, and the ceiling 40. A door frame 61a having an opening in a rectangular shape is formed at a forward part in the door panel 61. The door 62 has a plate shape extending to conform to a rectangular shape corresponding to the door frame 61a, and is provided so as to be configured to close the opening of the door panel 61. The door 62 is provided to be capable of opening and closing via a hinge provided at a front end thereof. The operator boards on a driver's seat via the door 62. A lateral glass 63 is fitted in an upper part of the door 62.

<Front Cover>

The front cover 70 forms a front part of the cab body 20 and partitions the cockpit from the forward side of the cockpit together with the window portion 100. The front cover 70 is provided to the entire range of the left-right pair of front support posts 58. The front cover 70 is constituted by a front lateral panel 80, a front lower panel 90, and a front upper panel 95.

A pair of the front lateral panels 80 is provided such that the front lateral panels 80 are separated in the vehicle width direction. The front lateral panel 80 is inclined rearward and outward in the vehicle-width direction while directed outward in the vehicle-width direction. The front lateral panel 80 is inclined so as to spread toward the outside of the cab body 20 from an upper side toward a lower side of the front lateral panel 80.

A rear end of the front lateral panel 80 extends along the vertical direction. The rear end of the front lateral panel 80 is connected to the entire range in the vertical direction of the front support post 58. An upper end of the front lateral panel 80 is connected to the ceiling 40. A front end of the front lateral panel 80 is inclined forward from an upper side toward a lower side thereof. The front end of the front lateral panel 80 is inclined inward in the vehicle-width direction from an upper side toward a lower side thereof. In The front lateral panel 80, a lateral-window frame 81 is formed so as to be cut away from the front end toward the rear side of the front lateral panel 80.

The front lower panel 90 extends in the vehicle width direction to span a lower portion of the pair of front lateral panel 80. The front lower panel 90 is connected to the lower portion of the lateral-window frame 81 at the front ends of the pair of front lateral panel 80 in the entire range in the vertical direction. The front lower panel 90 is inclined forward from the top to the bottom of the vehicle. The front lower panel 90 is formed so as to gradually decrease in a size in the vehicle width direction from the top to the bottom of the vehicle. The upper end of the front lower panel 90 is a lower window frame 91 extending in the vehicle width direction. Ends at both sides in the vehicle width direction of the lower window frame 91 are respectively connected to an end at the lower side of the corresponding lateral-window frame 81. A lower ridge line 71 formed by connecting the front lower panel 90 and the front lateral panel 80 is inclined forward toward the downward of the vehicle and is inclined inward in the vehicle-width direction toward the downward of the vehicle.

The front upper panel 95 extends in the vehicle width direction to span an upper portion of the pair of front lateral panels 80. The front upper panel 95 is connected to the upper portion of the lateral-window frame 81 at the front ends of the pair of front lateral panel 80 in the entire range in the vertical direction. The front upper panel 95 is arranged so as to be separated upward from the front lower panel 90. An upper end of the front upper panel 95 is connected to the ceiling 40. A lower end of the front upper panel 95 is an upper window frame 96 extending in the vehicle width direction. Ends at both sides in the vehicle width direction of the upper window frame 96 are respectively connected to an end at an upper side of the corresponding lateral-window frame 81. An upper ridge line 72 formed by connecting the front lower panel 90 and the front lateral panel 80 is inclined forward toward the downward of the vehicle, and is inclined inward in the vehicle-width direction toward the downward of the vehicle. The upper ridge line 72 and the lower ridge line 71 are positioned in the same straight line.

An opening at the forward side of the cab body 20 is formed so as to be partitioned by the lateral-window frames 81, the lower window frame 91, and the upper window frame 96 of the front cover 70.

<Window Portion>

The window portion 100 is provided so as to close the opening of the cab body 20. The window portion 100 includes a front windshield 110 and a front lateral windshield 120.

<Front Windshield>

The front windshield 110 is a glass having a flat plate shape extending the vehicle width direction and the vertical direction. In the front windshield 110, an upper-end edge 1 extending in the vehicle width direction is fitted in the upper window frame 96 of the front upper panel 95. In the front windshield 110, a lower-end edge 112 extending in the vehicle width direction is fitted in a lower window frame 91 of the front lower panel 90. The front windshield 110 is inclined forward toward the downward of the vehicle. The front windshield 10 extends on the same plane as the front lower panel 90 and the front upper panel 95.

Side-end edges 113 which are the ends at both sides in the vehicle width direction of the front windshield 110 are inclined forward and inward in the vehicle-width direction toward the downward of the vehicle. Each side-end edge 113 of the front windshield 110 extends on the same straight line as the lower ridge line 71 and the upper ridge line 72. The front windshield 110 becomes close to each other while a left-right pair of side-end edges 113 extends downward. That is, the front windshield 110 has a shape such that a distance in the vehicle width direction gradually narrows to the downward of the front windshield 110 in the planar direction.

<Front Lateral Windshield>

Figure 4:
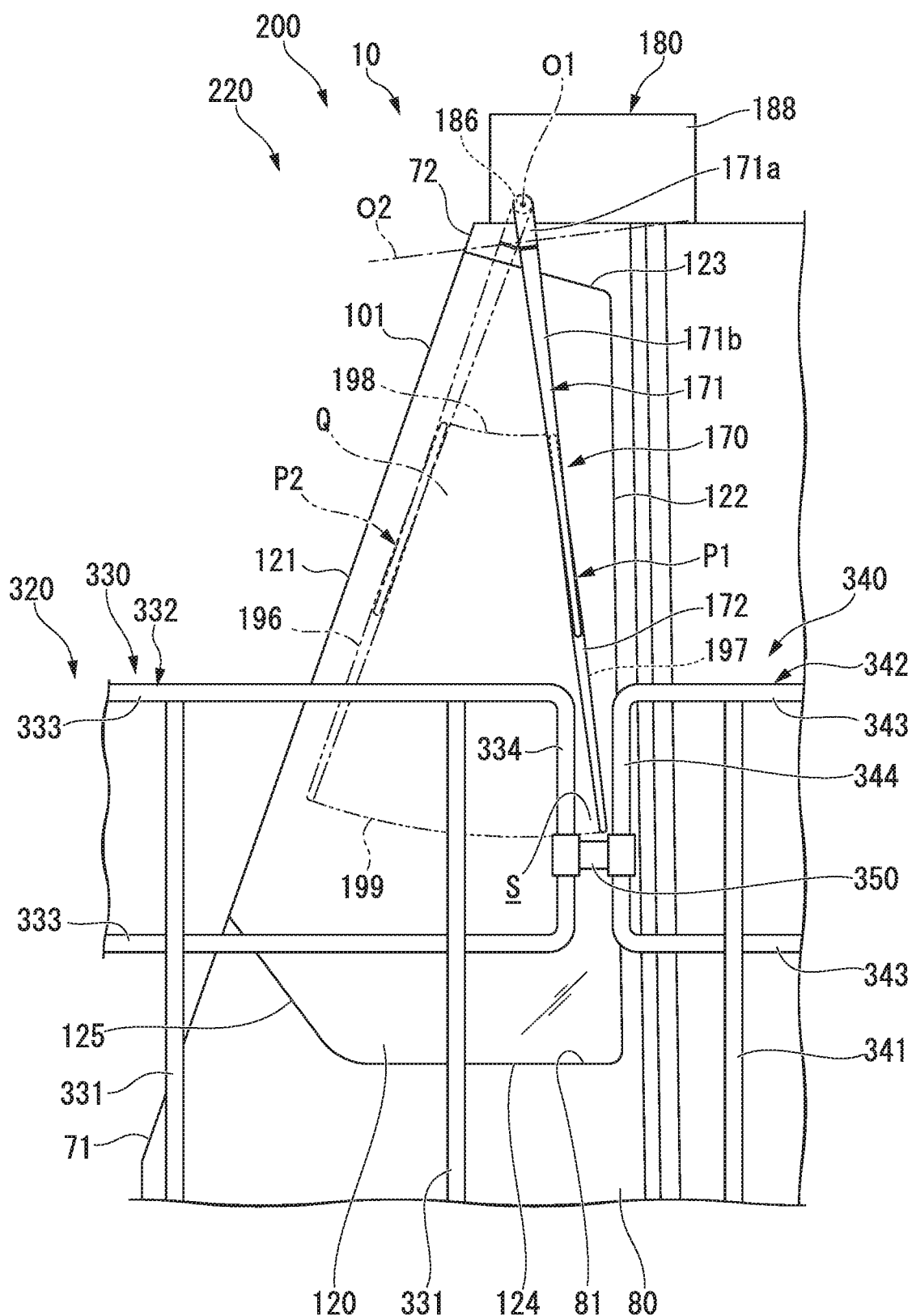
FIG. 4 is a diagram showing around a front lateral windshield, a wiper driving portion, and a front side wiper in the cab of the work vehicle according to the embodiment of the present invention.

The front lateral windshield 120, as shown in FIG. 4, is a glass that has a flat plate shape extending on the same plane of the front lateral panel 80 and that is fitted to the lateral-window frame 81 of the front lateral windshield 120. A left-right pair of the front lateral windshields 120 that each correspond to the lateral-window frame 81 of the front lateral panel 80 is provided. Each front lateral windshield 120 is connected to the side-end edge 113 of the front windshield 110 and extends diagonally rearward from the side-end edge 113. That is, the front lateral windshield 120 extends diagonally from the side-end edges 113 at both left and right ends of the front windshield 110 to the rearward side while extending outward in the vehicle-width direction. The front lateral windshield 120 extends to the outside of the cab body 20 from the top to the bottom of the vehicle.

A front-end edge 121 of the front lateral windshield 120 is connected to an end of outward in the vehicle-width direction of the front windshield 110 in the entire range in the vertical direction. A ridge line 101 formed by connecting the front-end edge 121 of the front lateral windshield 120 and the side-end edge 113 of the front windshield 110 so as to be in contact with or overlap with each other extends to be inclined inward in the vehicle-width direction while extending downward, and extends to be inclined forward while extending downward. That is, the ridge line 101 extends in the same inclination angle as the upper ridge line 72 and the lower ridge line 71.

A rear-end edge 122 of the front lateral windshield 120 extends in a vertical direction. The rear-end edge 122 of the front lateral windshield 120 extends along the rear end of the front lateral panel 80 and the front support post 58.

Here, in the present embodiment, since the front-end edge 121 of the front lateral windshield 120 is inclined forward and inward in the vehicle-width direction while extending downward, the front-end edge 121 and the rear-end edge 122 of the front lateral windshield 120 respectively extending linearly are gradually separated from the top to the bottom of the vehicle. That is, the front lateral windshield 120 has a shape that spreads downward.

The upper end of the front-end edge 121 and the upper end of the rear-end edge 122 of the front lateral windshield 120 are connected by an upper-end edge 123 of the front lateral windshield 120. The upper-end edge 123 is inclined downward from the front-end edge 121 toward the rear-end edge 122.

At the lower end of the rear-end edge 122 of the front lateral windshield 120, a lower-end edge 124 extending in parallel with the lower end of the front lateral panel 80 from the lower end of the rear-end edge 122 toward the front-end edge 121 is formed. An end on the side opposite to a connection point with the rear-end edge 122 in the lower-end edge 124 is connected to a lower end of the front-end edge 121 via an inclined edge 125. The inclined edge 125 is inclined upward from the lower-end edge 124 toward the front-end edge 121.

<Front Wiper>

The front wiper 130, as shown in FIG. 2, is provided so as to be capable of wiping a surface of the front windshield 110. The front wiper 130 is disposed below the front windshield 110 and provided so as to be rotatable around a rotation axis extending in the front-rear directions. The front wiper 130 reciprocally rotates to the right and left between a left and right pair of side-end edges 113 of the front windshield 110, that is, a left and right pair of ridge lines 101 of the front lateral windshield 120.

<Front Lateral Wiper>

Figure 5:
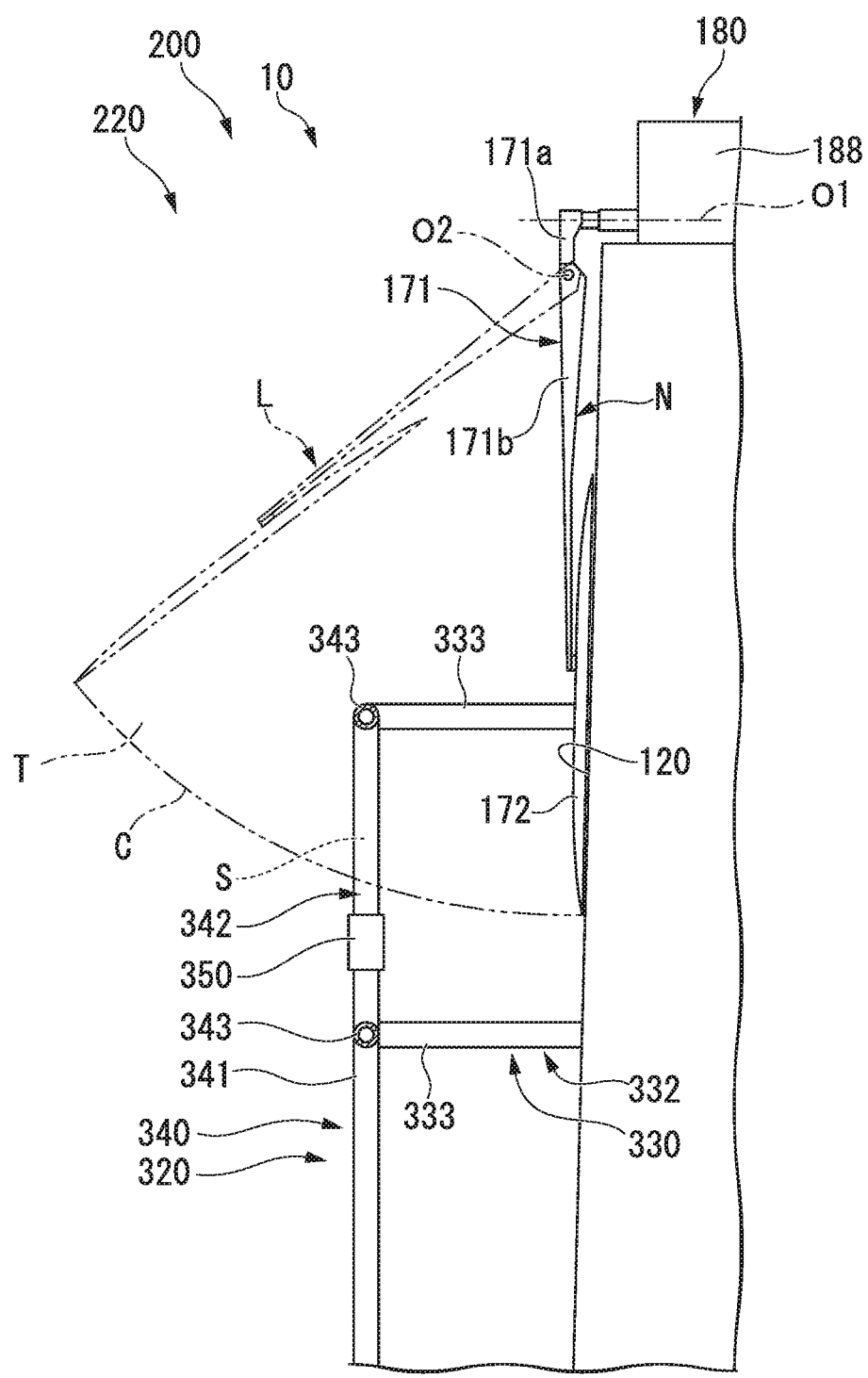
FIG. 5 is a diagram showing a movement range around a second axis of a front lateral wiper in the cab of the work vehicle according to the embodiment of the present invention.

The front lateral wiper 170, specifically as shown in FIGS. 4 and 5, is provided so as to be capable of wiping a surface of the front lateral windshield 120. The front lateral wiper 170 is provided so as to be rotatable around a first axis O1 that is disposed above the front lateral windshield 120 and extends in front-rear directions. The first axis O1 is disposed at a position closer to the front-end edge 121 (the ridge line 101) than the rear-end edge 122 of the front lateral windshield 120. The front lateral wiper 170 rotates so that the attitude thereof is changed between a normal position N and a rising position L which are described later. The front lateral wiper 170 is provided so as to be suspended from the top to the bottom of the vehicle.

The front lateral wiper 170 includes a front lateral wiper arm 171 and a front lateral wiper blade 172.

The front lateral wiper arm 171 is a so-called single arm. The front lateral wiper arm 171 includes an arm head 171a and an arm shank 171b.

The arm head 171a has an upper end is rotatably provided around the first axis O1. The arm shank 171b is provided at a lower end of the arm head 171a so as to be rotatable around a second axis O2 via a hinge. The second axis O2 is an axis extending in a direction different from the first axis O1, and extends in a tangential direction of a virtual circle centered on the first axis O1. The second axis O2 is positioned above the front lateral windshield 120. The arm shank 171b, as shown in FIG. 5, has a bar shape extending a radial direction of a virtual circle C centered on the second axis O2.

As shown in a solid line of FIG. 5, a position in which the arm shank 171b extends further downward from the arm head 171a, i.e., a position extending downward along the radial direction of the first axis O1, is defined as the normal position N. In the normal position N, the arm shank 171b extends downward along the front lateral windshield 120. That is, in the normal position N, a wiper rubber (not shown) connected to the front lateral wiper blade 172 is in contact with the surface of the front lateral windshield 120.

As shown in a dashed line of FIG. 5, a position in which the arm shank 171b extends so as to be separated from the front lateral windshield 120 by the arm shank 171b rotating around the second axis O2 so as to be separated from the front lateral windshield 120 is defined as the rising position L. The arm shank 171b is rotatable around the second axis O2 with the normal position N and the rising position L being set as a rotation end.

Inside the arm shank 171b, a spring with hooks passing between the arm shank 171b and the arm head 171a is provided (not shown). When the arm shank 171b is positioned at the normal position N, the arm shank 171b is held in the normal position N by the force applied by the spring. On the other hand, when the arm shank 171b is rotated toward the rising position L in a predetermined extent so as to be against the force applied by the spring, a point of action of the spring changes. As a result, the arm shank 171b is pressed by the force of the spring toward the rising position L. When the arm shank 171b is positioned at the rising position L, the arm shank 171b is held in the rising position L by the force applied by the spring. The rising position L is a so-called lock-back position.

In addition, the rising position L of the present embodiment indicates the position in which the arm shank 171b is held in a state of being separated from the front lateral windshield 120, but it is not limited thereto. The rising position L may be a limit position moving so that the arm shank 171b is separated from the windshield 120. It may be configured in a manner such that the arm shank 171b returns to the normal position N, if a worker does not hold the arm shank 171b at the limit position.

The front lateral wiper blade 172 is connected to the tip of the arm shank 171b that becomes a lower end of the front lateral wiper arm 171. The front lateral wiper blade 172 in a longitudinal direction extends the same direction as the arm shank 171b. The front lateral wiper blade 172 may be swingably connected to the tip of the arm shank 171b.

When the arm shank 171b is positioned at the normal position N, the front lateral wiper blade 172 is in contact with the front lateral windshield 120 from the outside via the wiper rubber which is not shown. At this time, the front wiper blade 150 is in contact with the front lateral windshield 120 in the entire range in the radial direction of the first axis O1.

When the arm shank 171b rotates to the rising position L from the normal position N, the front lateral wiper blade 172 is separated from an outer surface of the front lateral windshield 120. That is, the front lateral wiper blade 172 is separated from the surface of the front lateral windshield 120, and the front lateral wiper blade 172 transitions to the rising position L from the normal position N together with the arm shank 171b. An existence region of the arm shank 171b and the wiper blade when the arm shank 171b is rotated around the second axis O2 between the normal position N and the rising position L is defined as a movement range T of the front lateral wiper 170.

<Wiper Drive Device>

Figure 6:
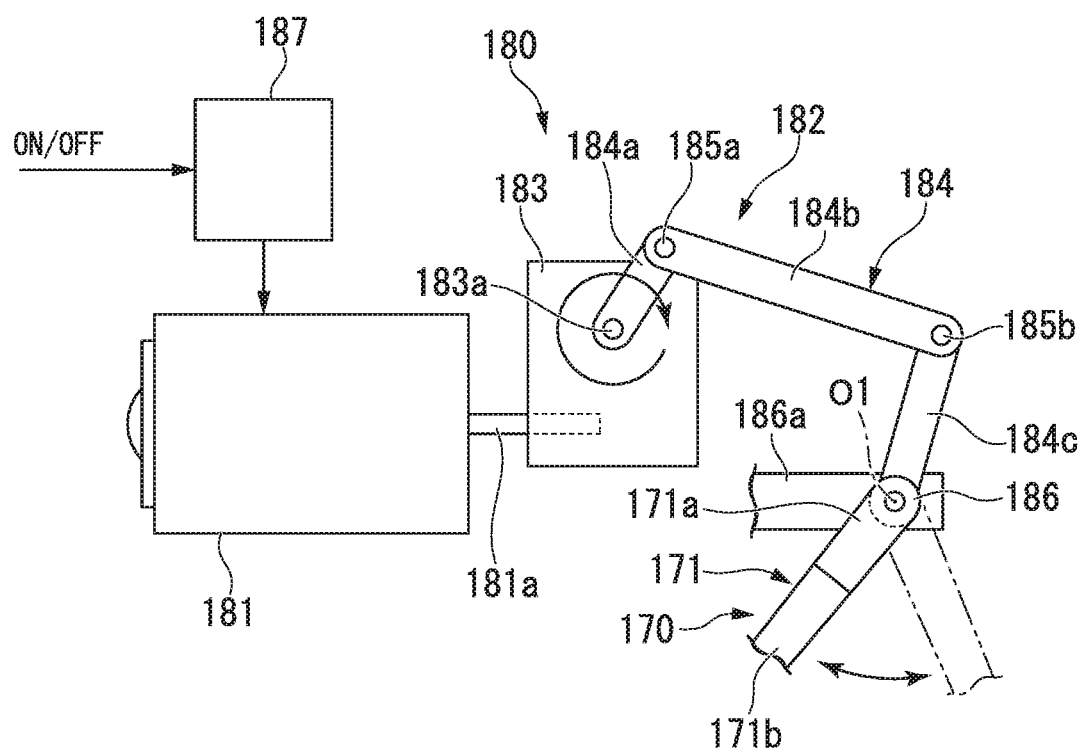
FIG. 6 is a schematic diagram showing a schematic configuration of the wiper drive device in the cab of the work vehicle according to the embodiment of the present invention.

The wiper drive device 180 causes the front lateral wiper arm 171 a reciprocally rotation around the first axis O1. The wiper drive device 180, specifically as shown in the schematic diagram of FIG. 6, includes an electric motor 181, a transmission device 182, and a drive circuit 187.

The electric motor 181 is rotationally driven according to current supplied from the drive circuit 187.

The transmission device 182 converts a rotational motion of the electric motor 181 into a swinging motion and transmits it to the front lateral wiper 170. The transmission device 182 of the present embodiment is constituted by a worm speed reducer 183 and a lever crank mechanism 184.

The worm speed reducer 183 converts the rotational motion of an output shaft 181a of the electric motor 181 to the rotational motion around an axis orthogonal to the output shaft 181a via a worm gear, and at the same time, outputs power by reducing the rotational speed a predetermined value via a reduction gear.

The lever crank mechanism 184 is a link mechanism for converting the rotational motion of an output shaft 183a of the worm speed reducer 183 into the swinging motion. The lever crank mechanism 184 includes a first link 184a, a second link 184b, a third link 184c, and an upper drive shaft 186.

A first end of the first link 184a is connected to the output shaft 183a of the worm speed reducer 183, and rotates according to the output shaft 183*a* of the worm speed reducer 183. A first end of the second link 184*b* is rotatably connected via a pin 185*a* to the other end of the first link 184*a*. A first end of the third link 184 *c* is connected to the second end of the second link 184*b* via a pin 185*b*. A second end of the third link 184*c* is connected to the upper drive shaft 186 provided rotatably around the first axis O1 with respect to the bracket 186*a*. A base end portion of the front lateral wiper arm 171 of the front lateral wiper 170 is connected to the upper drive shaft 186.

According to the above configuration, the upper drive shaft 186 swings around the first axis O1 according to the rotation of the output shaft 183*a* of the worm speed reducer 183. Therefore, the front lateral wiper arm 171 supported by the upper drive shaft 186 also reciprocally rotates around the first axis O1 together with the upper drive shaft 186.

The front lateral wiper 170 is reciprocally rotated by the wiper drive device 180, as shown in FIG. 4, between a rear position P1 (which is indicated by a solid line in FIG. 4) where the front lateral wiper blade 172 in the normal position N comes along the rear-end edge 122 of the front lateral windshield 120 and a front position P2 (which is indicated by a dash line in FIG. 4) where the front lateral wiper blade 172 comes along the front-end edge 121 of the front lateral windshield 120.

The drive circuit 187 is a circuit for driving the electric motor 181. In the drive circuit 187, an ON command is inputted by turning on, for example, a wiper switch provided in the cockpit. The drive circuit 187 supplies current to the electric motor 181 from a power source such as a battery based on the ON command.

An OFF command is input to the drive circuit 187 by turning off the wiper switch. When the OFF command is inputted, the drive circuit 187 stops the reciprocating rotation of the front lateral wiper 170 with the rear position P1 setting as an automatic stop position. The automatic stop position is a predetermined setting position where the front lateral wiper 170 is configured to be stopped at the position thereof.

That is, the drive circuit 187 continuously supplies current to the electric motor 181 so as to continue an operation of the reciprocating rotation until the front lateral wiper 170 moves to the rear position P1 even when the OFF command is input at the time when the front lateral wiper 170 is positioned at a position other than the rear position P1.

Such wiper drive device 180, as shown in FIGS. 3 and 4, is disposed in the housing space R of the ceiling 40 in a state of being housed in a case 188. In the present embodiment, the wiper drive device 180 is fixedly installed on the upper surface of the ceiling board 45. The upper drive shaft 186 of the wiper drive device 180 protrudes to the outside of the housing space through the communicating portion of the detachable cover 55. The front lateral wiper arm 171 of the front lateral wiper 170 is connected to a protruding portion of the upper drive shaft 186.

<Wiping Range of Front Lateral Windshield>

A wiping range Q of the front lateral windshield 120 by the front lateral wiper 170 is, as shown in FIG. 4, a range surrounded by a front edge 196, a rear edge 197, an upper edge 198, and a lower edge 199. That is, the range is a moving range of the wiper rubber (not shown) connected to the front lateral wiper blade 172.

The front edge 196 corresponds to a reciprocating end on the front side of the front lateral wiper 170 and extends along the front-end edge 121 (the ridge line 101) of the front lateral windshield 120. In the present embodiment, the front edge 196 extends in parallel with the front-end edge 121 of the front lateral windshield 120. The rear edge 197 corresponds to another reciprocating end on the rear side of the front lateral wiper 170 and extends along the rear-end edge 122 of the front lateral windshield 120. In this embodiment, the rear edge 197 extends diagonally so as to be gradually close to the rear-end edge 122 of the front lateral windshield 120 while extending downward. In addition, the wiper drive device 180 and the rear position P1 may be set so that the rear edge 197 becomes in parallel with the rear-end edge 122 of the front lateral windshield 120.

The upper edge 198 corresponds to a rotational locus at the upper end of the front lateral wiper blade 172 in the front lateral wiper 170 and has an arc shape centered on an upper axis O2. The lower edge 199 corresponds to a rotational locus at the lower end of the front lateral wiper blade 172 in the front lateral wiper 170 and has an arc shape centered on the upper axis O2. A curvature radius of the lower edge 199 is larger than a curvature radius of the upper edge 198.

Since the first axis O1 which is the rotation axis of the front lateral wiper 170 is positioned above the front lateral windshield 120, the wiping range Q of the front lateral wiper 170 is easy to be configured in a wide range in particular on the upper side of the front lateral windshield 120.

The front edge 196 and the rear edge 197 of the wiping range Q of the front lateral windshield 120 are separated from each other from the top to the bottom of the vehicle, in other words, the wiping range Q has a shape that spreads downward.

<Passage Formation Portion>

The passage forming portion 300, as shown in FIG. 2 is a member that forms a passage 310 along the cab and in a periphery of the cab. The passage forming portion 300 is formed in a U-shape in which a forward side thereof is closed and the rearward side thereof is opened in a plan view. The passage forming portion 300 extends to surround the cab 10 from a front and side. An upper surface of the passage forming portion 300 is the same height with a lower end of the lateral panel 60 and a lower end of the front cover 70 in the cab 10. The upper surface of the passage forming portion 300 is the passage 310 surrounding the cab from the front and side. The passage 310 extends along the periphery of the cab and has a width that the worker is capable of passing through.

The passage 310 includes a front passage 311, a front lateral passage 312, and a lateral passage 313.

The front passage 311 extends in the vehicle width direction in front of the cab 10. The front passage 311 extends along the front lower panel 90 of the cab 10.

The front lateral passage 312 is connected to a portion outward in the vehicle-width direction of the front passage 311 and extends diagonally rearward and outward in the vehicle-width direction from the front passage 311. The front lateral passage 312 extends along the front lateral panel 80 of the cab 10.

The lateral passage 313 is connected to the rearward side of the front lateral passage 312 and extends further rearward from a connection point with the front lateral passage 312. The lateral passage 313 extends along the lateral panel 60 of the cab 10.

<Passage Fence>

The passage fence 320 is a fence that is used as a handrail of the worker on the passage 310. The passage fence 320 rises upward from an outer edge of the passage 310 and extends in the entire extending range of the passage 310 along the outer edge of the passage 310.

The passage fence 320 includes a front fence portion 330, a lateral fence portion 340, and a connecting portion 350.

The front fence portion 330 extends in the entire range of front parts of the front passage 311 and the front lateral passage 312. A pair of lateral fence portions 340 is provided with a distance in extension directions of the front fence portion 330 and the passage 310 on both sides in the vehicle width direction of the front fence portion 330. The lateral fence portion 340 extends in the entire range of a rear part of the front lateral passage 312 and the lateral passage 313.

The front fence portion 330 includes a plurality of support rods 331 and a rail body 332. Each support rod 331 is a member having a bar shape extending in the vertical direction. A lower end of each support rod 331 is fixed to a corresponding portion of the front passage 311 and the front part of the front lateral passage 312 in an outer peripheral surface of the passage forming portion 300. The plurality of support rods 331 are provided with a distance in the extension direction of the passage 310 in the entire range of an installation range of the front fence portion 330. The rail body 332 is integrally fixed to a top of the support rod 331. The rail body 332 includes a horizontal bar 333 and a vertical bar 334. The horizontal bar 333 extends along the extension direction of the passage 310 with a distance being provided in the vertical direction. A pair of the horizontal bars 333 is provided in parallel with each other. The vertical bar 334 is provided so as to connect in the vertical direction the ends of the pair of horizontal bars 333.

The lateral fence portion 340 includes a plurality of support rods 341 and a rail body 342. Each support rod 341 is a member having a bar shape extending in the vertical direction. A lower end of each support rod 341 is fixed to a corresponding portion of the rear part of the front lateral passage 312 and the lateral passage 313 in the outer peripheral surface of the passage forming portion 300. The plurality of support rods 341 are provided with a distance in the extension direction of the passage 310 in the entire range of an installation range of the lateral fence portion 340. The rail body 342 is integrally fixed to a top of the support rod 341. The rail body 342 includes a horizontal bar 343 and a vertical bar 344. The horizontal bar 343 extends along the extension direction of the passage 310 with a distance being provided in the vertical direction. A pair of the horizontal bars 343 is provided in parallel with each other. The vertical bar 344 is provided so as to connect in the vertical direction the ends of the pair of horizontal bars 343.

A vertical position of the upper ends of the front fence portion 330 and the lateral fence portion 340, i.e., a vertical position in which upper horizontal bars 333 and 343 are disposed, is an interfering position when the front lateral wiper 170 is rotated around the second axis O2.

As shown in FIG. 4, the vertical bar 334 of an end portion outward in the vehicle-width direction of the front fence portion 330 and the vertical bar 344 at the forward side of the lateral fence portion 340 are separated in the extension direction of the passage 310 and arranged in parallel with each other. The vertical bar 334 of the front fence portion 330 and the vertical bar 344 of the lateral fence portion 340 which are adjacent to each other are connected together by the connecting portion 350. An arranged position of the connecting portion 350 is a position separated downward from the upper ends of the vertical bar 334 of the front fence portion 330 and the vertical bar 344 of the lateral fence portion 340. The connecting portion 350 is made of for example, sheet metal member, and is capable of being fastened to the vertical bar 334 and the vertical bar 344 by the bolt or the like, and is configured to be easily detachable.

By the vertical bar 334 of the front fence portion 330, the vertical bar 344 of the lateral fence portion 340, and the connecting portion 350, an opening S is formed by being partitioned by them. The opening S is opened upward the passage fence 320 and passes through the passage fence 320 from inside to outside thereof. The opening S is formed so as to be recessed downward from the upper end of the passage fence 320.

The opening S includes the movement range T of the front lateral wiper 170 which rotates between the normal position N and the rising position L. That is, the front lateral wiper 170 passes through the opening S when rotated around the second axis O2. In the present embodiment, the movement range T around the second axis O2 of when the front lateral wiper 170 is present at the rear position is included within the opening S. As shown in FIG. 5, when the front lateral wiper 170 is present at the rising position L, the front lateral wiper blade 172 of the front lateral wiper 170 is positioned outside the passage fence 320.

Operation and Effects

When the operator operates the wheel loader 200 in the driver's seat, the operator visually recognizes a front periphery through the window portion 100 configured by the front windshield 110 and the front lateral windshield 120. For example, when it is bad weather such as rainy weather or condensation occurs on an outer surface of the window portion 100, or when visibility gets worse because of adhering dust on the window portion 100, the front windshield 110 and the front lateral windshield 120 are wiped by the front wiper 130 and the front lateral wiper 170.

The front lateral wiper 170 is set at the normal position N when the front lateral windshield 120 is wiped. The front lateral wiper blade 172 positioned at the normal position N is rotated around the first axis O1 thereby the outer surface of the front lateral windshield 120 is wiped.

Here, when the worker cleans the outer surface of the cab 10 or when performs maintenance of the front lateral wiper blade 172, there is a case in which the front lateral wiper blade 172 is moved from the normal position N to the rising position L.

In this case, if the movement range T of the front lateral wiper blade 172 interferes with the passage fence 320, the front lateral wiper blade 172 cannot be rotated from the normal position N to a predetermined rising position L. Or else, the front lateral wiper blade 172 of the rising position L is limited to a position where the passage fence 320 comes into contact. In this case, the front lateral wiper blade 172 is positioned on the passage 310, and thus, maintenance activities performed on the passage 310 by the worker would significantly worsen.

On the other hand, according to the present embodiment, the movement range T of the front lateral wiper 170 from the normal position N to the rising position L is included within the opening S of the passage fence 320, the front lateral wiper 170 passes through the opening S. As a result, the front lateral wiper 170 and the passage fence 320 never interfere with one another. Therefore, the rising position L of the front lateral wiper 170 can be placed to a position separated from the passage 310. Therefore, it is possible to prevent from worsening in maintenance activities performed on the passage 310 by the worker.

Furthermore, by configuring so that the front lateral wiper 170 passes through within the opening S of the passage fence 320, it is possible to ensure a large height of the passage fence 320. That is, in order to avoid interference of the front lateral wiper 170 with the passage fence 320, it is not necessary to reduce the height of the passage fence 320, and thus, it is possible to ensure functionality as a handrail for the worker on the passage 310.

Since a space between the front fence portion 330 and the lateral fence portion 340 which are adjacent to each other is set as the opening S in which the movement range T of the front lateral wiper 170 is present, it is not necessary to form another opening S by changing design of the passage fence 320.

Since the front fence portion 330 and the lateral fence portion 340 are connected with the connecting portion 350, it is possible to restrain the front fence portion 330 and the lateral fence portion 340 with each other. Therefore, even if the opening S is provided between the front fence portion 330 and the lateral fence portion 340, the strength of the passage fence 320 can be secured, and it is possible to avoid inadvertent vibration of the passage fence 320. Since the connecting portion 350 is positioned below the movement range T of the front lateral wiper 170, the connecting portion 350 never interferes the rotation of the front lateral wiper 170.

In the present embodiment, the movement range T at the normal position N and at the rising position L in a case where the front lateral wiper 170 is present at the automatic stop position is included in the opening S. Therefore, without the position adjustment of the front lateral wiper 170 around the first axis O1, it is only necessary to raise the front lateral wiper 170. Thus, it is possible to easily change the front lateral wiper 170 to the rising position L that is separated from the passage 310.

The front-end edge 121 and the rear-end edge 122 of the front lateral windshield 120 have a shape that spreads downward. Correspondingly, the wiping range Q of the front lateral windshield 120 by the front lateral wiper 170 also has a shape that spreads downward. That is, since a wiping range Q that corresponds to a shape of the front lateral windshield 120 by the front lateral wiper 170 can be formed, it is possible to secure a large visibility through the front lateral windshield 120 for the operator.

In addition, the front lateral wiper 170 is configured to be suspended from above, and thus, the second axis O2 can be disposed above the front lateral windshield 120. Therefore, it is possible to prevent the front lateral wiper 170 at the rising position L from interfering with the worker on the passage 310.

Other Embodiments

As in the above, although an embodiment of the present invention has been described, the present invention is not limited thereto, and can be appropriately changed without departing from the technical idea of the invention.

For example, in the embodiment, the wiper drive device 180 is disposed within the ceiling 40, however it is not limited thereto. The first axis O1 which is the rotation axis of the front lateral wiper 170 only has to be disposed above the front lateral windshield 120. For example, the first axis O1 may be provided inside the front lateral panel 80.

The first axis O1 which is the center of rotation of the front lateral wiper 170 needs to be disposed not only above the front lateral windshield 120 but also may be disposed laterally or downward. Even in this case, the movement range T of the front lateral wiper 170 from the normal position N to the rising position L only has to pass through the opening S is the passage fence 320.

In embodiments, the space between the front fence portion 330 and the lateral fence portion 340 that are separated from each other in the extension direction of the passage 310 is set as the opening S, however it is not limited thereto. For example, the passage fence 320 is provided continuously along the passage 310, and an opening S that is recessed from above and penetrates the passage fence 320 from inside to outside thereof may be form at part of the passage fence 320.

The connecting portion 350 may not necessarily be provided.

In embodiments, the rising position L is explained as a position where the front lateral wiper 170 is positioned at the outside of the passage fence 320, however it is not limited thereto. The rising position L only has to be positioned at a position where the front lateral wiper 170 is separated from the front lateral windshield 120. For example, the rising position L may be set at a position where part of the front lateral wiper 170 is within the opening S.

In embodiments, an example that applies the cab 10 to the wheel loader 200 has been described, however, other work vehicles, for example, bulldozers, dump trucks, and motor graders may be applied to.

INDUSTRIAL APPLICABILITY

According to the work vehicle of the above aspects, maintainability can be improved.

BRIEF DESCRIPTION OF REFERENCE SYMBOLS

10: Cab, 20: Cab Body, 30: Support Structure, 31: Rear Support Post, 32: Rear Cross Beam, 40: Ceiling, 41: Ceiling Structure, 42: Side Vertical Beam, 43: Front Cross Beam, 44: Front Vertical Beam, 45: Ceiling Board, 46: Lateral Edge Portion, 47: Front Edge Portion, 48: Inclined Edge Portion, 50: Ceiling Cover, 51: Cover Body, 52: Cover Side-Edge Portion, 53: Cover Front-Edge Portion, 54: Cover Rear-Edge Portion, 55: Detachable Cover, 56: Communication Hole, 58: Front Support Post, 60: Lateral Panel, 61: Door Panel, 61a: Door Frame, 62: Door, 63: Lateral Windshield, 70: Front Cover, 71: Ridge Line, 72: Ridge Line, 80: Front Lateral Panel, 81: Lateral Window Frame, 90: Front Lower Panel, 91: Lower Window Frame, 95: Front Upper Panel, 96: Upper Window Frame, 100: Window portion, 101: Ridge Line, 110: Front Windshield, 111: Upper-End Edge, 112: Lower-End Edge, 113: Side-End Edge, 120: Front Lateral Windshield, 121: Front-End Edge, 122: Rear-End Edge, 123: Upper-End Edge, 124: Lower-End Edge, 125: Inclined Edge, 130: Front Wiper, 140: Front Wiper Arm, 150: Front Wiper Blade, 170: Front Lateral Wiper (Wiper), 171: Front Lateral Wiper Arm, 171a: Arm Head, 171b: Arm Shank, 172: Front Lateral Wiper Blade, 180: Wiper Drive Device, 181: Electric Motor, 181a: Output Shaft, 182: Transmission Device, 183: Worm Speed Reducer, 183a: Output Shaft, 184: Lever Crank, 184a: First Link, 184b: Second Link, 185a: Pin, 184c: Third Link, 185b: Pin, 186: Upper Drive Axis, 186a: Bracket, 187: Drive Circuit, 188: Case, 196: Front Edge, 197: Rear Edge, 198: Upper Edge, 199: Lower Edge, 200: Wheel Loader, 210: Working Equipment, 211: Boom, 212: Bucket, 213: Link, 214: Bell Crank, 215: Boom Driving Cylinder, 216: Bucket Drive Cylinder, 220: Vehicle Body, 230: Front Wheel, 240: Rear Wheel, 250: Vehicle Front Portion, 260: Vehicle Rear Portion, 270: Rear Frame, 271: Fuel Tank, 272: Engine Room, 300: Passage Forming Portion, 310: Passage, 311: Front Passage, 312: Front Lateral Passage, 313: Lateral Passage, 320: Passage Fence, 330: Front Fence Portion (Fence Portion), 331: Support Rod, 332: Rail Body, 333: Horizontal Bar, 334: Vertical Bar, 340: Lateral Fence Portion (Fence Portion), 341: Support Rod, 342: Rail Body, 343: Horizontal Bar, 344: Vertical Bar, 350: Connecting Portion, O1: First Axis, O2: Second Axis, P1: Rear Position, P2: Front Position, R: Housing Space, N: Normal Position, L: Rising Position, C: Virtual Circle, S: Opening, Q: Wiping Range, T: Movement Range

The invention claimed is:

1. A work vehicle comprising:
a cab, an inside of which is a cockpit, having a window portion;
a vehicle body having a passage on a periphery of the cab;
a wiper provided so as to be rotatable around a first axis and along the window portion, and configured to be rotated around a second axis that extends in a direction different from the first axis in a movement range between a normal position that is in contact with the window portion and a rising position separated from the window portion; and
a passage fence extending along an outer edge of the passage,
wherein the passage fence has an opening that is opened upward, passes through from an inside to an outside of the passage fence, and includes the movement range of the wiper,
wherein the wiper is provided so as to not interfere with the passage fence when the wiper is present in the opening.

2. The work vehicle according to claim 1, wherein
the passage fence has a plurality of fence portions separated from each other in a direction along the outer edge of the passage, and
the opening is formed so as to be partitioned by the fence portions adjacent to each other.

3. The work vehicle according to claim 2, wherein
the passage fence has a connecting portion that connects the fence portions adjacent to each other below an upper end of the fence portion, and
the opening is formed so as to be partitioned by the fence portions adjacent to each other and the connecting portion.

4. The work vehicle according to claim 1, wherein
the rising position is a position where the wiper is at a position of the opening or outside the passage fence.

5. The work vehicle according to claim 1, wherein
a wiper drive device is configured to reciprocally rotate the wiper around the first axis by an ON command being input, and is configured to stop the wiper at a predetermined set position by an OFF command being input, and
the opening includes the movement range that is around the second axis of the wiper in the predetermined set position.

6. The work vehicle according to claim 5, wherein
the window portion comprises:
a front windshield extending in a vehicle width direction, and
front lateral windshields extending diagonally rearward while connected on both sides in the vehicle width direction of the front windshield via ridge lines, and each having a rear-end edge extending in the vertical direction, the rear-end edge and each ridge line extending in the vertical direction being gradually separated from each other while directed downward,
wherein the wiper is rotatably disposed along the front lateral windshield around the first axis disposed above the front lateral windshield,
wherein the wiper drive device is configured to reciprocally rotate the wiper around the first axis between a rear position where the wiper extending along the rear-end edge and the front position where the wiper extending along the ridge line, and
wherein the predetermined set position is the rear position.

* * * * *